K. GAMMEL.
MACHINE FOR CUTTING DRIED PASTES.
APPLICATION FILED SEPT. 1, 1911.

1,029,059.

Patented June 11, 1912.

3 SHEETS—SHEET 1.

Witnesses:
Ger Schwarz
Sully Russo

Inventor
Karl Gammel
By his Attorneys
Redding Greeley Austin

K. GAMMEL.
MACHINE FOR CUTTING DRIED PASTES.
APPLICATION FILED SEPT. 1, 1911.

1,029,059.

Patented June 11, 1912.
3 SHEETS—SHEET 2.

Witnesses:

Inventor
Karl Gammel
By his Attorneys

K. GAMMEL.
MACHINE FOR CUTTING DRIED PASTES.
APPLICATION FILED SEPT. 1, 1911.
1,029,059.
Patented June 11, 1912.
3 SHEETS—SHEET 3.
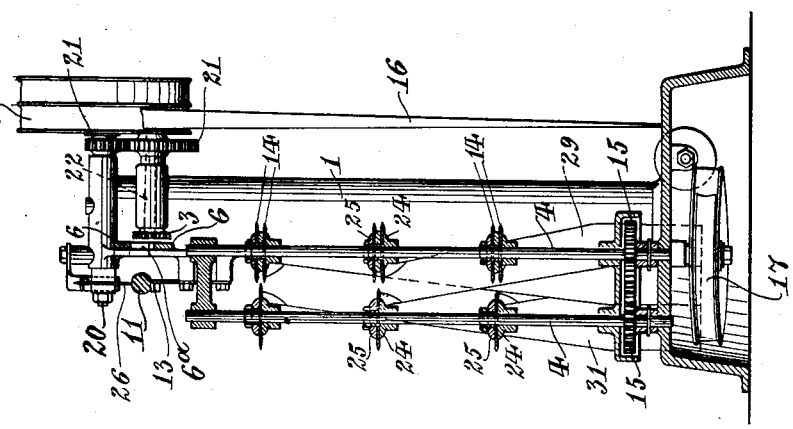
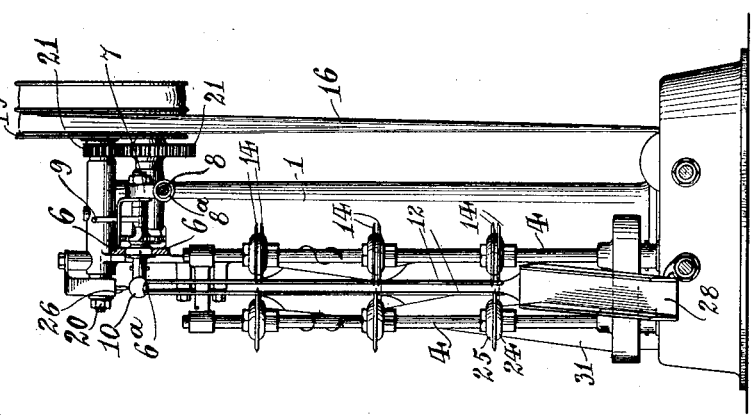

UNITED STATES PATENT OFFICE.

KARL GAMMEL, OF CLEVELAND, OHIO.

MACHINE FOR CUTTING DRIED PASTES.

1,029,059.  Specification of Letters Patent.  Patented June 11, 1912.

Application filed September 1, 1911. Serial No. 647,182.

*To all whom it may concern:*

Be it known that I, KARL GAMMEL, a subject of the Emperor of Germany, residing at Cleveland, in the county of Cuyahoga and State of Ohio, have invented certain new and useful Improvements in Machines for Cutting Dried Pastes, of which the following is a specification, reference being had to the accompanying drawings, forming a part hereof.

It is well known that dried pastes, such as macaroni, are brittle, and that the percentage of breakage losses is very high, especially as such goods are subject to handling. Such goods, especially macaroni and similar products, are usually hung upon sticks or similar supports soon after they have come from the press, and are dried while hanging therefrom.

The primary object of my invention is to provide means whereby the macaroni or similar product can be cut into suitable lengths for packing or for any other desired purpose without removing the same from the sticks or supports upon which they are placed before being dried and without separately handling the same in any way.

A further object of my invention is to provide means whereby the short and uneven ends of the products may be gathered in a separate receptacle from the other portions thereof.

Another object of the invention is to provide means whereby sections of different lengths may be cut and then said sections may be conveyed to separate packing tables or receptacles.

A further object of the invention is to provide a compact mechanism for handling the goods and for cutting the same automatically and with a minimum waste due to breakage.

The various other objects of the invention will be more fully set forth in the following description of one form of mechanism embodying my invention, which consists in the new and novel features of construction and combinations of parts hereinafter set forth and claimed.

Figure 1:
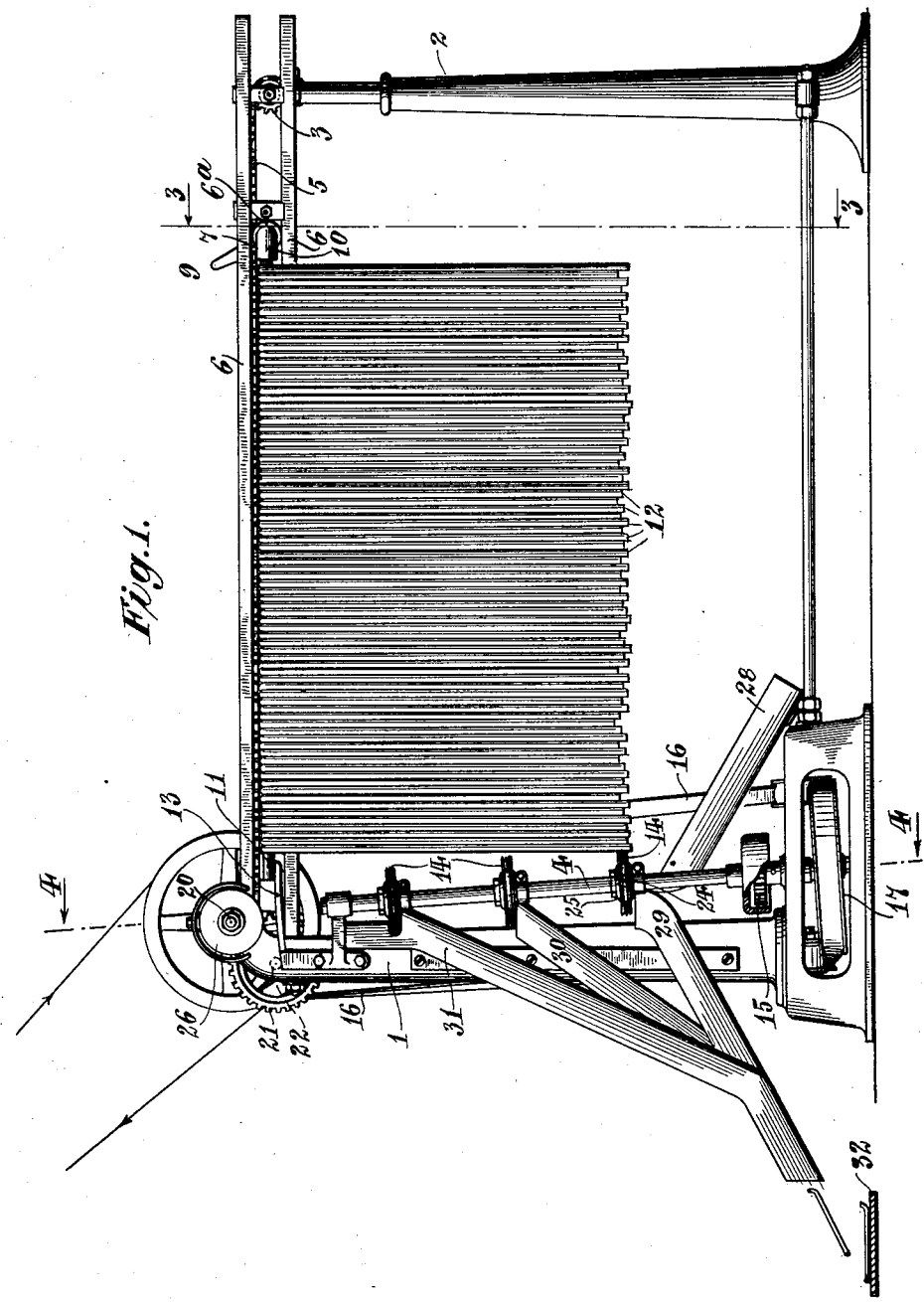
Figure 2:
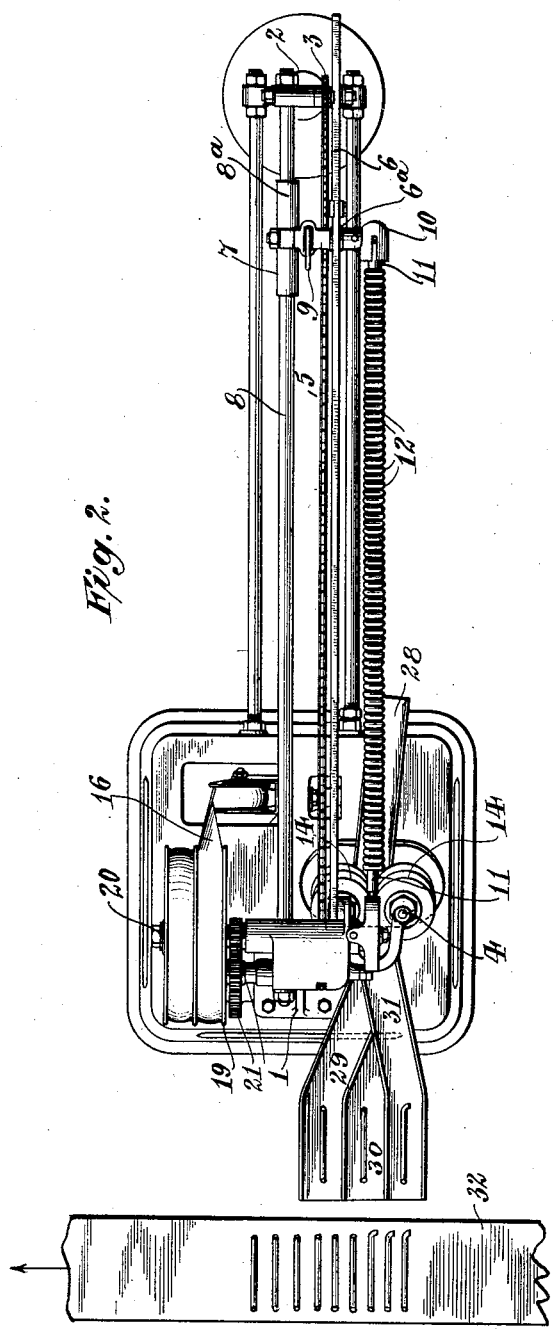

In the accompanying drawings: Figure 1 is a side elevation of my improved cutting machine showing the edible paste, such as macaroni, in position prior to being cut into the desired lengths. Fig. 2 represents a plan view of the same. Fig. 3 is a front elevation of the machine showing the cutters. Fig. 4 is a front elevation in section showing the method for attaching the cutters to their shafts and the driving mechanism.

The machine comprises two pillars or standards 1 and 2 respectively, which are disposed a suitable distance apart and which provide bearings for the sprocket wheels 3 upon which is mounted the endless conveyer such as a sprocket chain 5. A pair of vertically arranged guide rails 6 form a horizontal track between the standards, and between these rails runs a roller $6^a$. This roller is attached to a carriage or holder 7 comprising a long guide sleeve $8^a$ sliding on a guide bar 8. Said carriage comprises a latch lever 9 which normally locks the carriage to the advancing chain 5 to advance the carriage, and this lever may be released when desired to return the carriage by hand. The holder also comprises a sleeve or socket 10 to receive the end of a support, such as a stick 11 which carries the edible paste such as the macaroni tubes 12. The free end of the stick rests upon a curved guide 13 arranged on the standard 1 which permits the stick to slide over the top of the same as it is moved forward by the conveyer. Said guide normally projects between the depending ends of the macaroni and serves to steady the same when engaged by the cutting knives 14.

The cutting knives 14 are mounted upon two parallel shafts 4 which are mounted in the bearings provided in the standard 1. Said shafts are inclined forwardly at their upper ends, so that the paste will engage with each set of knives successively from the lower set to the upper set as the holder is moved forward. Said shafts are geared together by suitable gears 15 and are driven by any suitable means as the belt 16 which passes over a pulley 17 secured to one of said shafts, and which also passes over a pulley 19 upon the main or driving shaft 20. The said driving shaft is mounted on suitable bearings provided in the standard 1 and is geared by the gears 21 to a countershaft 22 which carries one of the sprocket wheels 3. The cutting knives 14 are arranged in an approximately horizontal plane and are mounted in holders 24 which are adjustably secured on the shafts by any suitable means as the clamps 25. Said cutters are preferably arranged as indicated in Fig. 3, that is, one shaft has two plates or cutters and the opposite cutter is arranged in a plane passing between the two. As the shafts are geared together they are driven in opposite directions as indicated by the arrows in Fig. 3 thus preventing displacement of the macaroni tubes from the supporting stick during the cutting operation.

On the main shaft 20 there is provided a cutter 26 the lower edge of which is substantially in contact with the upper face of the stick 11, so that as the stick advances, after the lower cutters have cut the macaroni into lengths, the loop of the macaroni at the stick is then severed by the knife 26. In this connection, it should be understood that the macaroni is formed in lengths hanging in loops from the stick 11.

In operation, the stick or other support carrying the macaroni or similar product is secured by one end in the socket 10 and its free end rests upon the guide 13. As soon as the stick is adjusted a connection is established with the traveling conveyer by means of the lever 9 so that the support with the product depending therefrom will be carried toward the cutters. Owing to the inclined position of the cutter shafts, the lower end of the goods will be first brought into contact with the lower set or pair of cutters. These irregular ends fall into the trough 28. As the goods are carried forward by the conveyer they come into contact with the next higher set or pair of cutters and the severed portion falls into a trough 29. The further travel brings the goods into contact with another set or pair of cutters and the severed portions drop into the trough 30. As the macaroni tubes advance from this point, they come in contact with the upper cutter 26 which cuts the loop of the tube and the two pieces thus detached fall into the uppermost guide trough 31. Special attention is called to the inclined arrangement of the cutters whereby they are made to operate successively upon the tubes beginning toward the lower end of the suspended tubes. This inclined arrangement facilitates the separation of the sections as they are detached. That is, the uneven ends are in line with the trough 28 and the other sections, as they are detached, pass into their troughs 29, 30 and 31. In other words, a certain knife or cutter has a certain trough beneath it into which the pieces severed by it exclusively fall. These troughs convey the detached sections to the packing table 32. Special attention is also called to the socket 10 and to the fact that the stick 11, carrying the tubes of macaroni, is placed in the socket and affords means for carrying the macaroni to the machine. This obviates the necessity for handling the macaroni tubes separately to cut them into lengths and prevents a large percentage of the breakage which would otherwise occur. Special attention is also called to the arrangement of the cutters, consisting in providing one cutter on one shaft and a pair of cutters on the opposite shaft, the single cutter being disposed between the planes of the other cutters. This arrangement of cutters is very effective in preventing the breaking of the edges of the tubes where they are cut.

It is obvious that by changing the position of the sets or pairs of cutters the lengths of the cut sections may be varied if desired. It is obvious also that various other changes within the skill of the mechanic may be made in the details of the mechanism herein shown and described without departing from the spirit of the invention provided the means set forth in the following claims be employed.

I claim as my invention:

1. In a machine for cutting dried pastes, the combination with a holder adapted to receive a stick for supporting said paste in an approximately vertical plane, a guide for the opposite end of said stick, and a plurality of cutters inclined vertically for severing said depending paste in predetermined lengths, and a carrier for advancing said paste to said cutters.

2. In a machine for cutting dried pastes, the combination of a holder adapted to receive one end of a support whereby said pastes may be supported in an approximately vertical plane, a guide engaging the free end of said support and permitting longitudinal movement thereof, a plurality of cutters arranged in the path of said paste, and means for automatically feeding said paste toward the said cutters.

3. In a machine for cutting dried pastes, means for supporting the pastes in a substantially vertical plane, means for advancing the same in a predetermined path, and cutters on opposite sides of the said path and coöperating to sever the paste.

4. In a machine for cutting pastes, the combination of two approximately parallel inclined shafts, cutting knives secured to said shafts opposite each other and moving in an approximately horizontal plane, means for supporting said edible pastes in two approximately vertical parallel planes, and means for automatically feeding said pastes against and between said knives.

5. In a machine for cutting dried pastes, the combination with two upright parallel shafts inclined slightly and spaced apart, cutters on said shafts arranged opposite each other in pairs and operative in an approximately horizontal plane, an endless carrier, a holder, means for detachably securing said holder to the carrier, a support for the pastes mounted in said holder and moved thereby, and permitting the pastes to be arranged in approximately parallel vertical planes, and a separate trough for each pair of cutters for removing the portions of paste severed by said cutters.

6. In a machine for cutting macaroni, means for suspending the macaroni in a substantially vertical plane with the lower portions swinging freely, a plurality of cutters adapted to cut the macaroni into lengths, and means for presenting the macaroni to said cutters in succession and progressively from below upwardly.

7. In a machine for cutting macaroni and the like, a plurality of cutters, a carriage adapted to advance a plurality of macaroni tubes toward said cutters, an endless conveyer moving toward said cutters, and means for detachably connecting said carriage to said conveyer.

8. In a machine for cutting macaroni and the like, a plurality of cutters arranged in an approximately vertical line so that said cutters are displaced horizontally from each other, means for advancing the macaroni to said cutters and troughs under said cutters respectively to receive the sections of macaroni severed respectively by said cutters.

9. In a machine for cutting macaroni and the like, a stick adapted to support the macaroni tubes looped thereupon, a plurality of cutters for severing the suspended macaroni tubes into lengths, means for advancing said stick to bring the tubes against said cutters, and another cutter having its edge adjacent to said stick for severing the loops of macaroni after said first cutters have operated.

10. A machine for cutting macaroni and the like, comprising a carriage, a socket moving with said carriage, a stick removably held in said socket and adapted to suspend a plurality of macaroni tubes having loops passing over said stick, a plurality of cutters adapted to sever the macaroni tubes into lengths, another cutter thereabove adjacent to said stick and adapted to sever the loops of macaroni, and means for advancing the macaroni to said cutters.

11. In a machine for cutting macaroni and the like, in combination, a stick for suspending the macaroni by loops passing over said stick, a plurality of cutters for cutting the macaroni into lengths, another cutter for cutting the loops of the macaroni, and means for advancing the macaroni against said cutters.

12. In a machine for cutting macaroni and the like, in combination, a stick for suspending the macaroni by loops passing over said stick, a plurality of cutters for cutting the macaroni into lengths, another cutter for cutting the loops of the macaroni, and means for advancing the macaroni against said cutters, said cutters being arranged in a line inclined from the vertical and the lower cutters being arranged to act upon the macaroni before the upper cutters.

This specification signed and witnessed this 28th day of August A. D., 1911.

KARL GAMMEL.

Witnesses:
G. R. COLLAR,
E. M. HOLMGREN.

Copies of this patent may be obtained for five cents each, by addressing the "Commissioner of Patents, Washington, D. C."